US012608703B2

(12) United States Patent
Huussin et al.

(10) Patent No.: US 12,608,703 B2
(45) Date of Patent: Apr. 21, 2026

(54) SYSTEMS AND METHODS FOR GENERATION AND USE OF A DISTRIBUTED PRIVATE KEY WITH A DISTRIBUTED LEDGER NETWORK

(71) Applicant: JPMORGAN CHASE BANK, N.A., New York, NY (US)

(72) Inventors: Chaddy Huussin, West New York, NY (US); Yassir Nawaz, Short Hills, NJ (US); Angelo Aratan, Brooklyn, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 13 days.

(21) Appl. No.: 18/678,428

(22) Filed: May 30, 2024

(65) Prior Publication Data

US 2024/0403869 A1 Dec. 5, 2024

Related U.S. Application Data

(60) Provisional application No. 63/505,140, filed on May 31, 2023.

(51) Int. Cl.
G06Q 20/38 (2012.01)
G06Q 20/02 (2012.01)
(Continued)

(52) U.S. Cl.
CPC ......... G06Q 20/3825 (2013.01); G06Q 20/02 (2013.01); G06Q 20/105 (2013.01);
(Continued)

(58) Field of Classification Search
CPC ............. G06Q 20/3825; G06Q 20/351; G06Q 20/3829; G06Q 20/346; G06Q 20/105; G06Q 20/202; G06Q 20/02; H04L 9/0816
(Continued)

(56) References Cited

U.S. PATENT DOCUMENTS

2020/0280433 A1* 9/2020 Wright .................. H04L 9/0894
2021/0224797 A1* 7/2021 Berengoltz ........ G06Q 20/3825
(Continued)

FOREIGN PATENT DOCUMENTS

WO 20210074750 4/2021
WO WO-2021074750 A1 * 4/2021 ........... H04L 9/3247

OTHER PUBLICATIONS

English text for WO 2021074750-A1 (Year: 2021).*
(Continued)

*Primary Examiner* — James D Nigh
(74) *Attorney, Agent, or Firm* — GREENBERG TRAURIG LLP

(57) ABSTRACT

Disclosed techniques relate to a method of securing a distributed ledger system, comprising: receiving, from a user application executed on an electronic user device and at a shared security platform executed on a backend, a request for a private key, the private key capable of accessing an account of a distributed ledger network; generating and storing a first shard of the private key on a smart card using the protocol; generating and storing a second shard of the private key on at least one institution backend using a protocol; receiving, from a merchant point of sale system, a request for a transaction associated with the account and the first shard; retrieving, from the at least one institution backend, the second shard; and generating the private key from partial signatures of the first shard and the second shard, and upon generating the complete signature, executing the transaction.

16 Claims, 4 Drawing Sheets

(51) Int. Cl.
| | |
|---|---|
| *G06Q 20/10* | (2012.01) |
| *G06Q 20/20* | (2012.01) |
| *G06Q 20/34* | (2012.01) |
| *H04L 9/08* | (2006.01) |

(52) U.S. Cl.
CPC ......... *G06Q 20/202* (2013.01); *G06Q 20/351* (2013.01); *G06Q 20/3829* (2013.01); *G06Q 20/346* (2013.01); *H04L 9/0816* (2013.01)

(58) Field of Classification Search
USPC .......................................................... 705/71
See application file for complete search history.

(56) References Cited

U.S. PATENT DOCUMENTS

| | | | |
|---|---|---|---|
| 2021/0312431 A1* | 10/2021 | Ravinathan ........ | G06Q 20/0658 |
| 2023/0177496 A1* | 6/2023 | Le Van Gong ....... | H04L 9/3247 |
| 2023/0281606 A1* | 9/2023 | Jakobsson ................ | H04L 9/50 |
| | | | 705/67 |
| 2024/0007309 A1* | 1/2024 | Dowling ................... | H04L 9/50 |

OTHER PUBLICATIONS

Shamir "How to Share a Secret", Communications of the ACM, Dec. 1979, pp. 612-613) (Year: 1979).*
Sober et al. "Distributed Key Generation with Smart Contract using zk-SNARKs", 2023 Association for Computing Machinery, Mar. 27-31, 2023, 10 pages (Year: 2023).*
International Search Report and Written Opinion of the International Searching Authority, dated Aug. 9, 2024, from corresponding International Application No. PCT/US2024/031932.

* cited by examiner

Receiving a request for a private key for an account — 410

Generating and storing a first shard — 420

Generating and storing a second shard — 430

Receiving a request for a transaction for the account — 440 retrieving the first shard and the second shard — 450 generating the private key and executing the transaction — 460

SYSTEMS AND METHODS FOR GENERATION AND USE OF A DISTRIBUTED PRIVATE KEY WITH A DISTRIBUTED LEDGER NETWORK

RELATED APPLICATIONS

This application claims priority to, and the benefit of, U.S. Provisional Patent Application Ser. No. 63/505,140, filed May 31, 2023, the disclosure of which is hereby incorporated, by reference, in its entirety.

BACKGROUND

1. Field of the Invention

Aspects generally relate to systems and methods for generation and use of a distributed private key with a distributed ledger network.

2. Description of the Related Art

Public and private keys can be used to protect certain assets. However, private keys can be susceptible to being derived and stolen. As discussed herein, a solution is a shared custody model for digital assets, where both an institution and a customer may cryptographically sign a transaction to reduce liability and risk faced by a providing institution while simultaneously providing confidence and control to both customers and providing institutions. Such solution, while having clear benefits, also has technological challenges that must be addressed for practical and efficient use of such a platform.

SUMMARY

In some aspects, the techniques described herein relate to a method including: opening, by a user, an application associated with a shared security platform; indicating, by the user in the application, a new account/card setup option; delivering a smart card to the user; selecting and setting, by the user, a pin for the card; selecting, by the user, a shared responsibility model; and selecting, by the user, a shard backup strategy.

In some aspects, the techniques described herein relate to a method of securing a distributed ledger system, comprising: receiving, from a user application executed on an electronic user device and at a shared security platform executed on a backend, a request for a private key, the private key capable of accessing an account of a distributed ledger network, wherein the private key is associated with a public key and both the private key and public key are required to, when provided to a holding institution, access the account; generating and storing a first shard of the private key on a smart card using the protocol; generating and storing a second shard of the private key on at least one institution backend using a protocol; receiving, from a merchant point of sale system and to the shared security platform, a request for a transaction associated with the account and a partial signature of the first shard; retrieving, from the at least one institution backend, a partial signature of the second shard; and generating a complete signature of the private key from the partial signatures of the first shard and the second shard, and upon generating the complete signature, executing the transaction.

In some aspects, the method may further comprise storing a backup first shard at a first backup institution, wherein the backup first shard replaces the first shard for the transaction. In some aspects, the method may further comprise storing a backup first shard at a first backup trustee, wherein the backup first shard generates a partial signature that replaces the partial signature of the first shard for the transaction. In some aspects, the smart card includes a computational node configured to provide the partial signature of the first shard to the institution backend. In some aspects, the smart card may be configured, upon activation through a user's electronic device at the merchant point of sale system, to send the partial signature of the first shard as an encrypted payload from the smart card to a compute node in the shared security platform, and the compute node is configured to provide the partial signature of the first shard in a transaction signature. In some aspects, the user's electronic device further receives from the user's electronic device verification of a user PIN to allow the partial signature to be transferred from the smart card.

Aspects relate to a method of securing a distributed ledger system, comprising: receiving, from a user application executed on an electronic user device and at a shared security platform executed on a backend, a request for a private key, the private key capable of accessing an account of a distributed ledger network, wherein the private key is associated with a public key and both the private key and public key are required to, when provided to a holding institution, access the account; generating and storing a first shard of the private key on a first institution backend using a protocol; generating and storing a second shard of the private key on a second institution backend using the protocol; receiving, from a merchant point of sale system and to the shared security platform, a request for a transaction associated with the account and a first partial signature of the first shard; retrieving, from the at least one institution backend, a second partial signature of the second shard; and generating a complete signature of the private key from the partial signatures of the first shard and the second shard, and upon generating the complete signature, executing the transaction.

In some aspects, the method may further comprise retrieving a backup first shard signature of a backup first shard at a backup institution, wherein the backup first shard signature replaces the first signature for the transaction. In some aspects, the method may further comprise retrieving a backup first shard signature of a backup first shard at a first backup trustee, wherein the backup first shard signature replaces the first signature for the transaction.

In some aspects, the shared security platform receives the partial signatures of the first and second shards through encrypted communication. In some aspects, the first and second institution backends provide the first and second partial signatures, respectively, after determining that the transaction meets a transaction policy for each institution. In some aspects, the method may further comprise sending an update of the transaction to the user application after the transaction is executed.

Aspects relate to a method of securing a distributed ledger system, comprising: receiving, from a user application executed on an electronic user device and at a shared security platform executed on a backend, a request for a private key and a number of desired shards, the private key capable of accessing an account of a distributed ledger network, wherein the private key is associated with a public key and both the private key and public key are required to, when provided to a holding institution, access the account, wherein the number of desired shards is at least two; generating and storing a first shard of the number of desired shards of the private key on a smart card using the protocol; generating and storing a second shard of the number of desired shards of the private key on a first institution backend using a protocol; receiving, from a merchant point of sale system and to the shared security platform, a request for a transaction associated with the account and a first partial signature of the first shard; retrieving, from the at least one institution backend, a second partial signature of the second shard; and generating a complete signature of the private key from the partial signatures of the first shard and the second shard, and upon generating the complete signature, executing the transaction.

In some aspects, the method may further comprise storing a backup first shard at a first backup institution, wherein a backup partial signature of the backup first shard replaces the first partial signature of the first shard for the transaction. In some aspects, storing a backup first shard may be at a first backup trustee, wherein a backup partial signature of the backup first shard replaces the first partial signature of the first shard for the transaction. In some aspects, the smart card includes a computational node configured to provide, upon activation, the first partial signature of the first shard to the institution backend. In some aspects, the first and second institution backends provide the first and second partial signatures, respectively, after determining that the transaction meets a transaction policy for each institution.

In some aspects, the smart card is configured, upon activation through a user's electronic device at the merchant point of sale system, to send the partial signature of the first shard as an encrypted payload from the smart card to a compute node in the shared security platform, and the compute node is configured to provide the partial signature of the first shard in the private key. In some aspects, the number of desired shards is three and a third shard of the number of desired shards of the private key is generated and stored at the first institution backend using the protocol, and the first institution backend generates the first partial signature based on the second shard and the third shard. In some aspects, the shared security platform receives the partial signatures of the first and second shards through encrypted communication.

DETAILED DESCRIPTION

Figure 1:
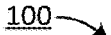
FIG. 1 is a block diagram of a shared security platform, in accordance with aspects.
Figure 1:
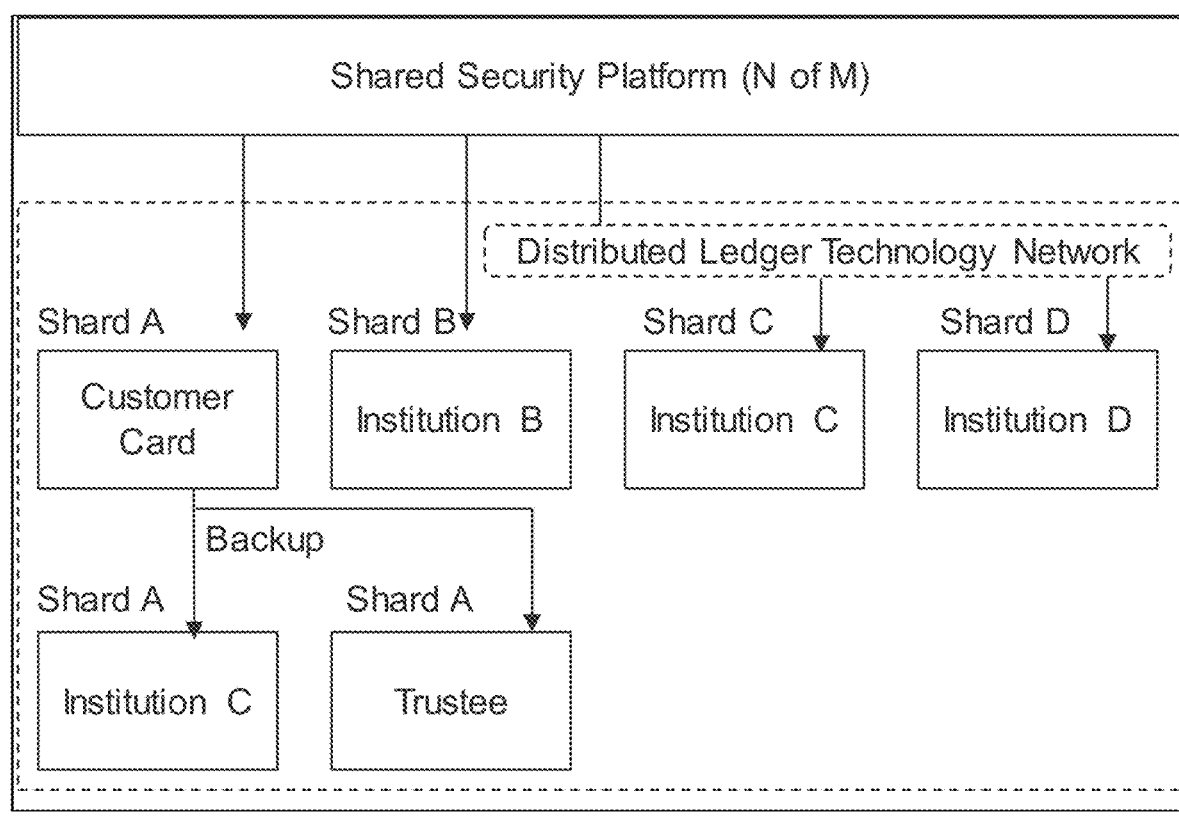
Figure 1:

Aspects generally relate to systems and methods for generation and use of a distributed private key with a distributed ledger network.

Aspects are directed to a technological solution that balances security and usability while distributing control of an asset's variables between institutions and customers. Control is based on a customer's personal needs and risk tolerance. Aspects may include combining both secure multiparty computation and smart card technology where the private key is generated during the card provision process using a distributed key generation process. A customer shard may be provisioned in a customer smart card. The customer may determine a number of shards, and a beneficiary. Aspects may include an infrastructure solution that protects digital asset keys, a process to generate such keys, methods to securely provision shards, and a method for utilization of the keys or key shards within the infrastructure.

Distributed ledgers are a type of electronic storage (i.e., a data store) wherein the data store is replicated to members of a decentralized network. The replicated copies of the various data stores are kept synchronized via communications across the decentralized network. Accordingly, distributed ledgers are a network of nodes. Each node maintains a copy of the data store and is also responsible for computationally validating or approving transactions that are replicated to other nodes across the network. The technique or protocol for approving a transaction across all nodes of a distributed ledger is known as a consensus mechanism. All distributed ledgers use one or more consensus mechanisms that allow the various nodes to agree on a data value or on the state of the distributed ledger at large. Exemplary consensus mechanisms include Proof of Work (PoW), Proof of Stake (POS), Delegated Proof of Stake (DPOS), and Byzantine Fault Tolerance (BFT) based consensus protocols.

Blockchain is an exemplary type of distributed ledger that uses a linear system (i.e., a chain) of data blocks for recording and verifying transactions. The ledger of a block chain usually is immutable. A blockchain ledger is public in that it can be examined, and transactions thereon can be observed. Blockchains, however, are anonymous (or, at least, pseudo-anonymous) in the sense that transactions can only be attributed to a public key. A public key is associated with address on the blockchain ledger, but no personal information is associated with a ledger address or with a public key (which is an alpha-numeric string that represents a long number). A ledger address is calculated based on a public key and other cryptographic factors. The ledger address on a distributed ledger is used as a shorter identifier for transacting on the ledger. It is the private key, however, that indicates ownership of an asset stored on the ledger.

The private key is secretly generated and stored in a secure environment. Private key can be managed by custodian "wallets". A wallet may be hardware, software, or a combination of both. The wallet may be configured for operative communication with at least one node of the distributed ledger. When a user transfers an asset (i.e., undertakes a transaction) on a blockchain ledger, the blockchain software signs the transaction with the user's private key but does not disclose the private key. The private key signature signifies to the distributed ledger software that the state change of the assets ownership is authorized by the user associated with the address and the public key (e.g., the owner of the digital asset being transferred), and such signature is the only way to transfer the ledger state (e.g. assets from the associated address/public key to another address on the ledger).

As noted, above, without the private key that corresponds to the public key of a ledger address, digital assets cannot be transferred on the ledger, and the holder of a private key will be seen as the legitimate authority with respect to any associated assets recorded on the ledger. Accordingly, private key loss or misappropriation represents an enormous risk for the owner of digital assets recorded on a blockchain ledger, and/or for an organization that secures users' private keys.

The concept of custody in the field of distributed ledger technology (DLT) refers to the maintenance and protection of a private key which has the ability to move or change the state of the ledger (e.g., a distributed ledger, blockchain ledger, etc.) where digital assets are represented. As noted above, a public key represents an address on the ledger and a wallet acts as an interface to the address and the ledger. The corresponding private key is needed in order to undertake a transaction that changes the state of the ledger.

Secured multiparty computation (MPC) involves two or more parties jointly submitting input data to an agreed upon computational function that is executed by two or more computing parties. Output may be provided to two or more result parties. Input parties do not reveal their input data to other parties (i.e., the data remains secret). Input parties, computing parties, and result parties may or may not be the same parties, but all may be members of an MPC network.

In accordance with aspects, an MPC protocol (e.g., MPC implementation of ECDSA) may be leveraged to sign a transaction with a previously generated private key in a distributed manner so that the key material is not exposed in a single form at any place and time. Instead, only a full signature is used after the full signature is reconstructed from partial signatures from each shard.

An MPC may be used in conjunction with a Distributed Key Generation (DKG) algorithm to generate a private key in multiple parts known as shards. A DKG is an algorithm that allows multiple parties to generate a random number without the other parties knowing the random number but allows all parties to agree to the generated random number. A distributed ledger transaction may be signed using an MPC protocol that uses a fragmented key generated through a DKG algorithm without bringing the fragments, or shards, of the key together at any one place or time.

In accordance with aspects, a digital asset card or smart card may be provisioned, and the digital asset card may include one of several shards that together comprise a private key that is associated with a public key and address/wallet on a distributed ledger network (a "DLT network"). The various shards of the private key may be generated using a Distributed Key Generation algorithm (DKG) with the support of a distributed ledger network. A smart card may include a hardware security module (HSM) that may securely store a private key shard on the smart card. A smart card may be provisioned with one of several key shards while one or more organizations store the other shards such that, when an MPC protocol is used, allows for a distributed signing of a transaction written to a distributed ledger. Accordingly, the responsibility for safekeeping of shards is distributed across various institutions (e.g., a network of participants) in order to lower risk for all parties involved.

In accordance with aspects, a shared security platform built on top of a DLT network is a software layer responsible for provisioning a new account for a user with an institution that provides access to and management of transactions on a DLT network (i.e., a providing institution). Initial provisioning of an account on a shared security platform may determine (based on input from a user) a number of shards that the customer would like a private key distributed into. A user may select a number of shards or the number of shards may be determined based on one or more of a number of resources available, a number of resources that can efficiently be used, a type of resources available (e.g., two shards may be used if a smart card and a provider is selected but three shards may be used if only providers or network partners are used), a value of an asset in the account or to be protected, or a length of customer relationship with the shared security platform provider. Aspects may facilitate division of a private key into two or more shards, according to a user's risk tolerance for key misappropriation (with a relatively higher number of shards lowering risk of misappropriation).

Moreover, a shared security platform may determine how many and which shards must be present for a signature. For instance, if a user desires to minimize risk from a lost card, the user may specify that only 3 of 4 total shards need be present to sign a transaction and a shard secured on a smart card need not be one of the three (but may be). In this way, a user may report a lost or stolen smart card and the card (and the shard stored thereon) may be restricted from use on the shared security platform. The user, however, may still be able to recover the assets stored on the ledger and/or perform transactions through instructions to institutional holders of the remaining 3 shards. In other aspects, a user may request that two smart cards are provisioned each with the same shard, so that in the case of loss or destruction of one card, the second card may be used in transactions on the distributed ledger.

In some embodiments, a shard refresh can occur, resulting in re-generating shards, where each shard generates a new partial signature resulting in a new final signature.

For some aspects, shards may be regenerated at any time. For some aspects, shards may be regenerated after a loss or destruction of a card, a data breach, or a compromised credentials.

In accordance with aspects, once an account has been established, a user may use a smart card to initiate transactions signatures on the distributed ledger. In some aspects, a user may use a merchant's point-of-sale (POS) system or another type of electronic gateway that has been configured to be in operative communication with a providing organization's shared security platform. The user may swipe, tap, insert, or otherwise connect a smart card with the gateway and the card may send a partial signature to the gateway. The gateway may, in turn, send the partial signature to a backend processing infrastructure of the platform, which may retrieve any other needed partial signatures (e.g., generated by the providing institution or a partner institution that is part of the DLT network) in order to fully sign and then submit the transaction on the distributed ledger. In other aspects, a mobile application executing on a mobile electronic device may act as a gateway device, and a partial signature from a smart card may be transferred to the platform via, e.g., secure NFC protocol from the card to the device/application, and from the application to the platform for full signature construction and execution of a transaction. In some aspects, the nodes may update a state of the account and the platform may capture the transaction confirmation. Updates may be provided to the user regarding the state of the account (e.g., balances) and/or transaction. Other triggering events may include a user scanning a payment QR code, a mobile app notification, or a user tapping a smart card on the user's own mobile device or gateway device.

In accordance with aspects, a smart card may include a computational node that is a node of an MPC network. The card may be inserted into hardware that may bring the card online and provide transaction signing functionality with the key shard secured thereon. In some aspects, a partial signature of the shard may be provided to the platform. In other aspects, the shard may be encrypted and be prevented from being sent as a payload (e.g., as a method argument) to protect privacy and increase security.

In accordance with aspects, a smart card may operate as a trusted enclave that may store the key shard and transfer it to achieve a partial signature. In other aspects, a smart card may include a trusted enclave that is configured as a node of a MPC computational network and perform the partial signature.

FIG. 1 is a block diagram of a shared security platform, in accordance with aspects. FIG. 1 shows multiple private key shards, Shards A-D, that, together, make up a complete private key. Shard A has been provisioned to a smart card held by the customer and has also been shared with Institution C and/or a trustee for backup purposes (in case the smart card is lost or stolen). Shards B, C, and D (or A, as a backup) are stored/maintained by various institution computers or servers that are each a participant on the depicted DLT network. FIG. 1 also shows an exemplary customer smart card.

In some embodiments, each participant and/or customer may be responsible for safeguarding its own shard. In some embodiments, institution computers or servers may execute an application associated with communication with a shared security platform. The institution application may provide safeguarding capabilities for the shard, such as encryption.

Figure 2:
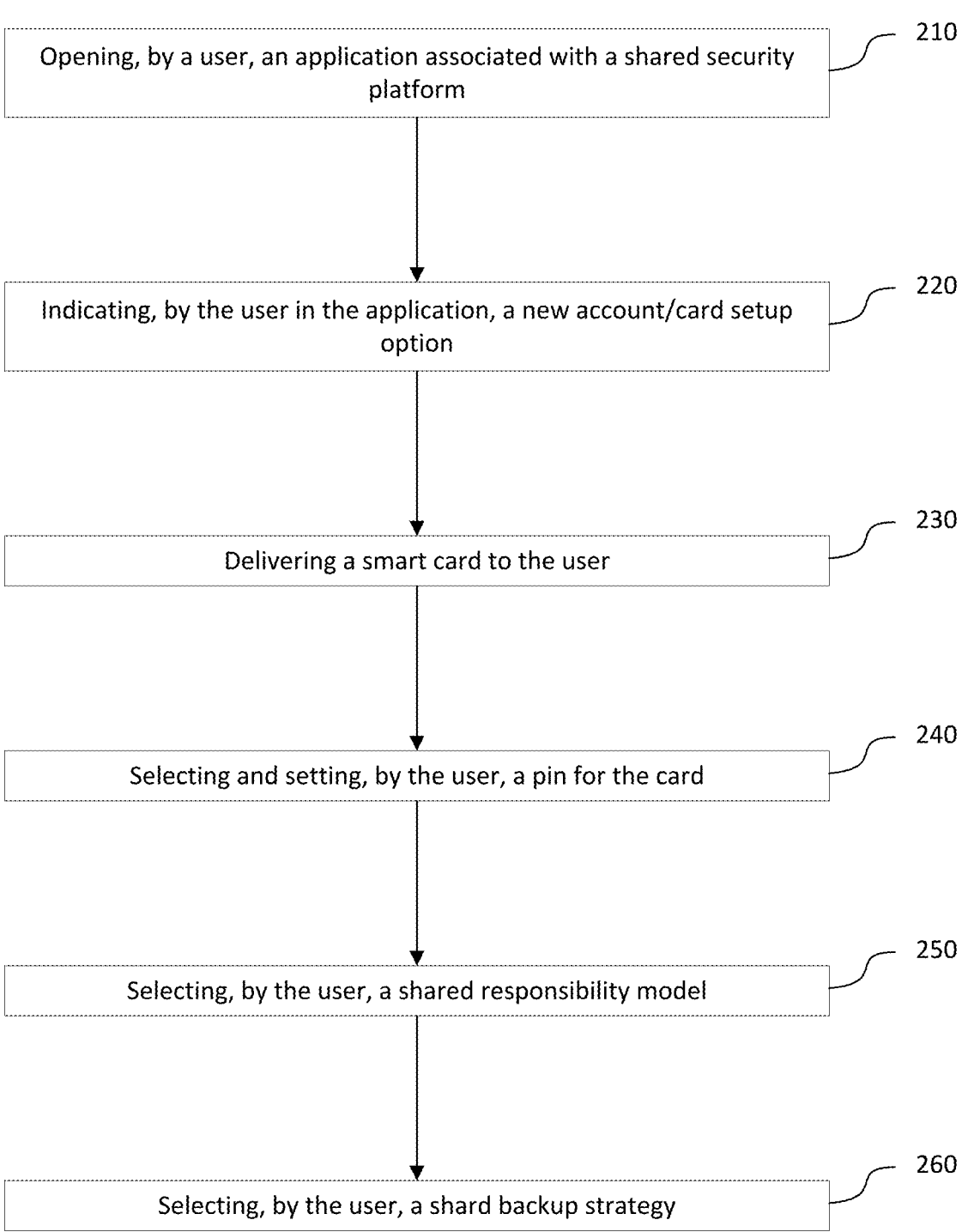
FIG. 2 is a logical flow for user onboarding to a shared security platform, in accordance with aspects.

FIG. 2 is a logical flow for user onboarding to a shared security platform, in accordance with aspects.

Step 210 includes: User opens associated application (e.g., a mobile application). The mobile application may be executed by a user electronic device.

Step 220 includes: User indicates a new account/card setup option. The user mobile device may receive an indication, from the user application, and send the application to the shared security platform, a new account/card setup option.

Step 230 includes: A smart card with a shard is generated and delivered to a user. The smart card may comprise a microchip. The smart card may comprise a flash memory chip or solid-state drive. The smart card may be configured to use near-field communication to communicate wirelessly with a reader, including part of a merchant point of sale device.

Step 240 includes: Users select and set a PIN or another type of challenge response system for the card if needed. The PIN or challenge response system may be used to access the partial signature of the card and in order for the partial signature to be sent to the payments platform. A mobile application through a user's electronic device may interact with the card (e.g., through a wired or wireless link such as NFC). The partial signature may be received by a merchant point of sale device to validate a transaction.

Step 250 includes: User selects a Shard Responsibility Model. In some aspects, a user may select a configuration of storing shards. For example, a user may select a provider to store a shard and a customer shard such as a smart card. As another example, a user may select two or three providers, a Network Partner, and a customer shard such as a smart card. Each provider or Network Partner may be responsible for storage, maintenance, and security of a shard.

Step 260 includes: A User may select a Shard Backup Strategy. For example, the user may select a second smart card or a Network Partner or provider that keeps a backup copy that may be separately protected. For example, the User may be able to access the backup copy separately. According to some aspects, the provider or Network Provider be able to deactivate an original or backup shard if it has been compromised (e.g., a data leak, lost smart card).

When a transaction is approved (signed) by the user using the card (e.g., a tapping action) it still requires the participants (institutions) shard as well, the institutions can perform all due diligence before signing with its own shards, that can happen automatically based on rules or might require human intervention if needed.

To move assets, a user may log in with the appropriate credentials, set the amount, and destination address (email, phone number, or wallet) and tap the self-card into a device. If the destination address is unknown a claim address notification is sent to the destination through the partner network, and only after the destination has KYC the address to identify the signing taking place.

Figure 3:
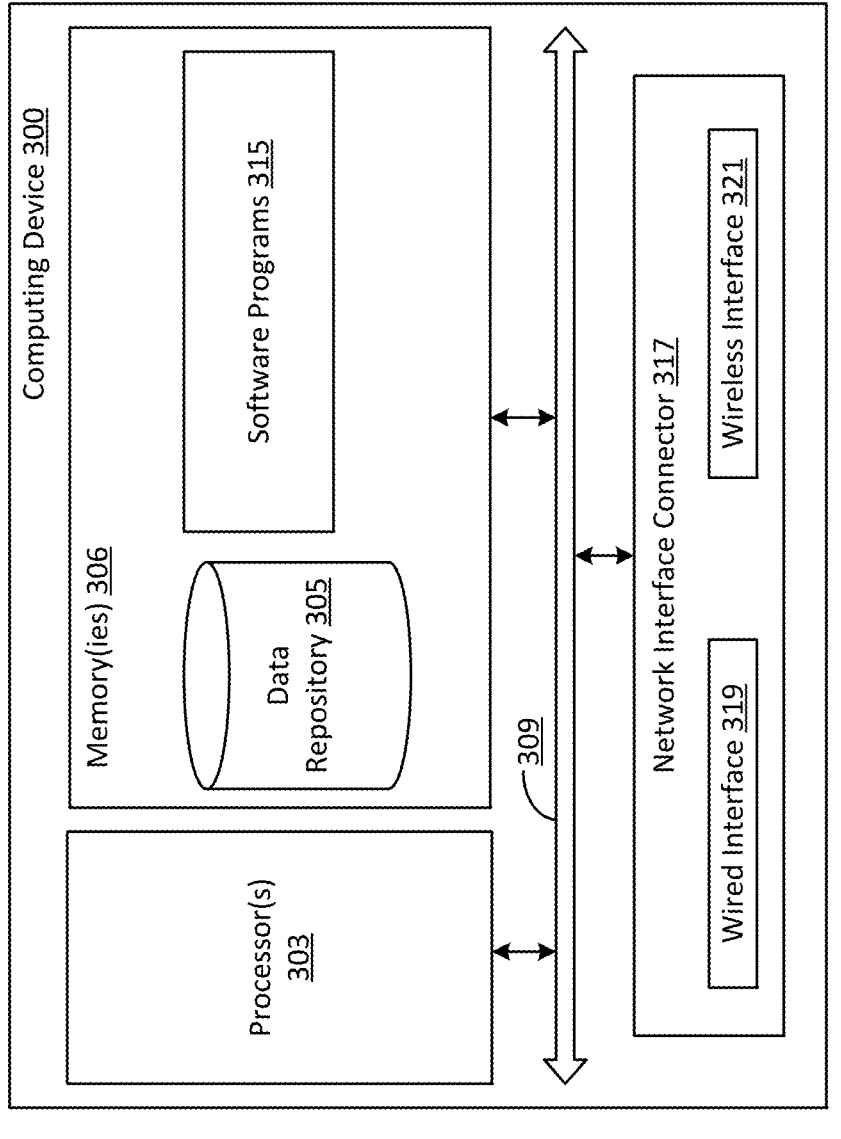
FIG. 3 is a block diagram of a computing device for implementing certain aspects of the present disclosure.

FIG. 3 is a block diagram of a computing device for implementing certain aspects of the present disclosure. FIG. 3 depicts exemplary computing device 300. Computing device 300 may represent hardware that executes the logic that drives the various system components described herein. For example, system components described herein and various database engines, database servers, and other computer applications and logic may include, and/or execute on, components and configurations like, or similar to, computing device 300.

Computing device 300 includes a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 300 may also have user interface components, such as a screen for displaying graphical user interfaces and receiving input from the user, a mouse, a keyboard and/or other input/output components (not shown).

Figure 4:
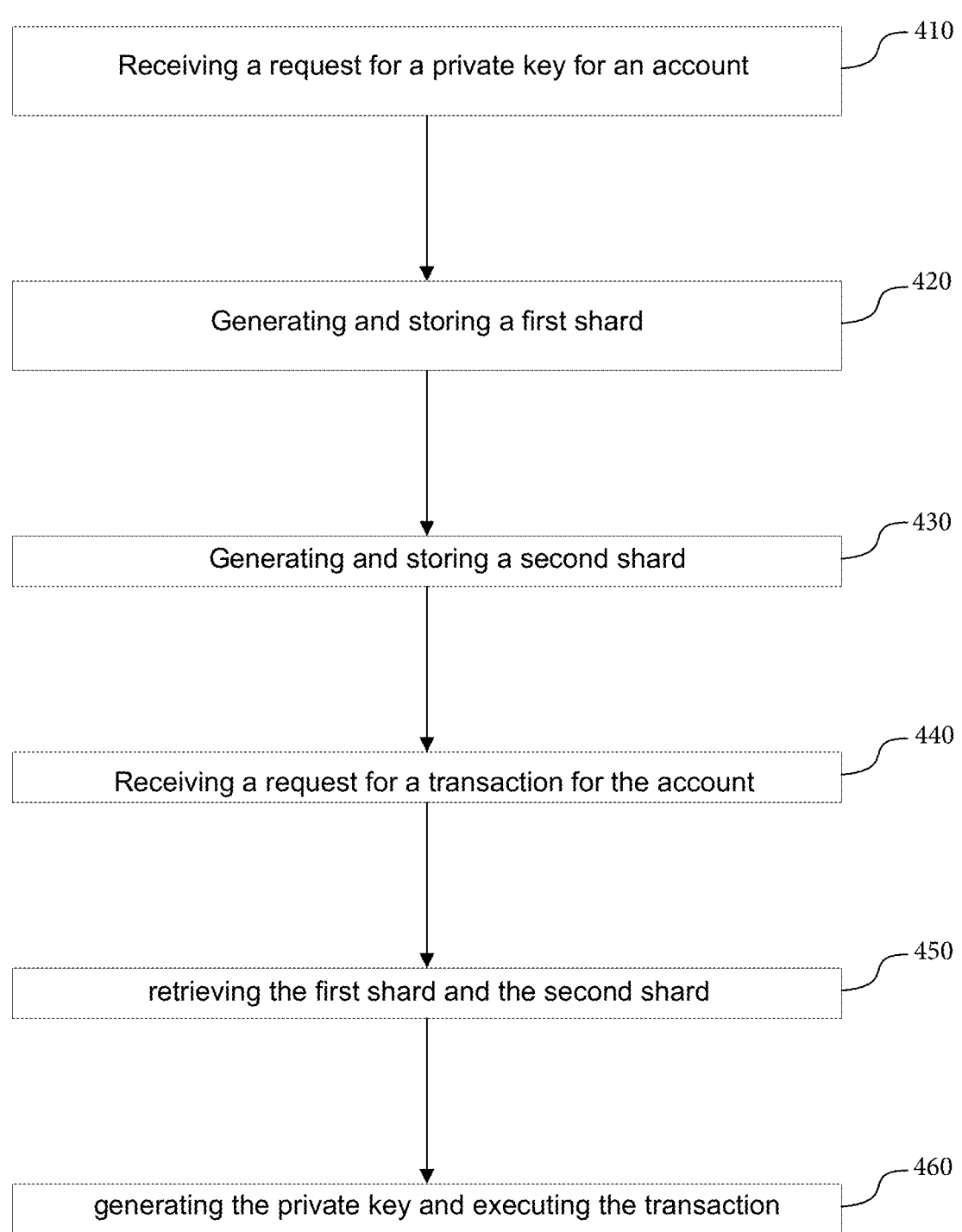
FIG. 4 is a logical flow for transaction approval using a shared security platform, in accordance with aspects.

FIG. 4 is a logical flow for user onboarding to a shared security platform, in accordance with aspects.

Step 410 includes: receiving a request for a private key, from a user application executed on an electronic user device and at a shared security platform, for example an application, executed on a backend, for example of a financial institution. The request may be included in a request for user initialization consistent with disclosed aspects. The private key may be capable of accessing an account of a distributed ledger network, wherein the private key is associated with a public key and both the private key and public key are required to, when provided to a holding institution, access the account. Assets may be included in the account such as digital currency or tokenized digital assets.

According to some aspects, the request may include a request for a number of shards. Consistent with disclosed aspects, the request may include a specification of the configuration of shard storage. Consistent with disclosed aspects, a number of shards and policies may be derived based on the monetary value of the assets. Policies may be consistent with those discussed herein (e.g., do not sign unless destination is preapproved and/or below a threshold amount, retrieve human verification, time of day, location of merchant is preapproved).

Step 420 includes: in response to the private key request, generating and storing a first shard of the private key on a smart card using the protocol. Consistent with disclosed aspects, the smart card may be provisioned and the shard of the smart card generated, and the smart card may be provided to a customer.

Step 430 includes: in response to the private key request, generating and storing a second shard of the private key on at least one institution backend using a protocol. The institution backend may be a Provider or Network Partners consistent with disclosed embodiments.

Step 440 includes: receiving, from a merchant point of sale system and to the shared security platform, a request for a transaction associated with the account and the first shard.

Step 450 includes: retrieving, from the at least one institution backend (provider or Network Partners), the partial signatures associated with each of the shards associated with the private key. Each institution backend may validate the transaction request according to its own policy (e.g., anti-money laundering, know your client, according to a specified address or account recipient, a specific amount for a specific time period, a repetitive transfer such as daily). The transaction request may be received from the payments platform. In some aspects, the policies can differ among institution backends or trustees. In some aspects, each institution backend may form its own partial signature from multiple shards within its control before sending a collective partial signature to the payments platform to form the full signature.

Step 460 includes; generating a complete signature of the private key from the partial signatures of each shard (e.g., the first shard and the second shard), and upon generating the complete signature, executing the transaction. In some aspects, the generated private key may be verified against a record of the private key. In some aspects, the generated full signature may be verified against a record of the full signature.

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing machine" a "computing device," an "electronic device," a "mobile device," etc. These may be a computer, a computer server, a host machine, etc. As used herein, the term "processing machine," "computing device, "electronic device," or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular step, steps, task, or tasks, such as those steps/tasks described above. Such a set of instructions for performing a particular task may be characterized herein as an application, computer application, program, software program, or simply software. In one aspect, the processing machine may be or include a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

The processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

What is claimed is:
1. A method of securing a distributed ledger system, comprising:

US 12,608,703 B2

13 receiving, from a user application executed on an electronic user device and at a shared security platform executed on a backend, a request for a private key, the private key capable of accessing an account of a distributed ledger network, wherein the private key is associated with a public key and both the private key and public key are required to, when provided to a holding institution, access the account;

generating and storing a first shard of the private key on a smart card using the protocol;

generating and storing a second shard of the private key on at least one institution backend using a protocol;

receiving, from a merchant point of sale system and to the shared security platform, a request for a transaction associated with the account and a partial signature of the first shard;

sending, by the smart card upon activation through a user's electronic device at the merchant point of sale system, the first shard as a payload from the smart card to a compute node in the shared security platform, wherein the compute node is configured to provide the partial signature of the first shard in a transaction signature;

retrieving, from the at least one institution backend, a partial signature of the second shard; and generating a complete signature of the private key from the partial signatures of the first shard and the second shard by combining the partial signatures of the first shard and the second shard via a multiparty threshold signature protocol wherein the private key is only assembled at the shared security platform executed on the backend, and upon generating the complete signature, executing the transaction.

2. The method of claim 1, further comprising storing a backup first shard at a first backup institution, wherein the backup first shard replaces the first shard for the transaction.

3. The method of claim 1, further comprising storing a backup first shard at a first backup trustee, wherein the backup first shard generates a partial signature that replaces the partial signature of the first shard for the transaction.

4. The method of claim 1, wherein the smart card includes a computational node configured to provide the partial signature of the first shard to the institution backend.

5. The method of claim 1, wherein the user's electronic device further receives from the user's electronic device verification of a user PIN to allow the partial signature to be transferred from the smart card.

6. A method of securing a distributed ledger system, comprising:

receiving, from a user application executed on an electronic user device and at a shared security platform executed on a backend, a request for a private key, the private key capable of accessing an account of a distributed ledger network, wherein the private key is associated with a public key and both the private key and public key are required to, when provided to a holding institution, access the account;

generating and storing a first shard of the private key on a first institution backend using a protocol;

generating and storing a second shard of the private key on a second institution backend using the protocol;

receiving, from a merchant point of sale system and to the shared security platform, a request for a transaction associated with the account and a first partial signature of the first shard;

retrieving, from the at least one institution backend, a second partial signature of the second shard;

sending, by the smart card upon activation through a user's electronic device at the merchant point of sale system, the first shard as a payload from the smart card to a compute node in the shared security platform, wherein the compute node is configured to provide the partial signature of the first shard in a transaction signature; and generating a complete signature of the private key from the partial signatures of the first shard and the second shard by combining the partial signatures of the first shard and the second shard via a multiparty threshold signature protocol wherein the private key is only assembled at the shared security platform executed on the backend, and upon generating the complete signature, executing the transaction.

7. The method of claim 6, further comprising retrieving a backup first shard signature of a backup first shard at a backup institution, wherein the backup first shard signature replaces the first signature for the transaction.

8. The method of claim 6, further comprising retrieving a backup first shard signature of a backup first shard at a first backup trustee, wherein the backup first shard signature replaces the first signature for the transaction.

9. The method of claim 6, wherein the first and second institution backends provide the first and second partial signatures, respectively, after determining that the transaction meets a transaction policy for each institution.

10. The method of claim 6, the method further comprising sending an update of the transaction to the user application after the transaction is executed.

11. A method of securing a distributed ledger system, comprising:

receiving, from a user application executed on an electronic user device and at a shared security platform executed on a backend, a request for a private key and a number of desired shards, the private key capable of accessing an account of a distributed ledger network, wherein the private key is associated with a public key and both the private key and public key are required to, when provided to a holding institution, access the account, wherein the number of desired shards is at least two;

generating and storing a first shard of the number of desired shards of the private key on a smart card using the protocol;

generating and storing a second shard of the number of desired shards of the private key on a first institution backend using a protocol;

receiving, from a merchant point of sale system and to the shared security platform, a request for a transaction associated with the account and a first partial signature of the first shard;

sending, by the smart card upon activation through a user's electronic device at the merchant point of sale system, the first shard as a payload from the smart card to a compute node in the shared security platform, wherein the compute node is configured to provide the partial signature of the first shard in a transaction signature;

retrieving, from the at least one institution backend, a second partial signature of the second shard; and generating a complete signature of the private key from the partial signatures of the first shard and the second shard by combining the partial signatures of the first shard and the second shard via a multiparty threshold signature protocol wherein the private key is only assembled at the shared security platform executed on the backend, and upon generating the complete signature, executing the transaction.

12. The method of claim 11, further comprising storing a backup first shard at a first backup institution, wherein a backup partial signature of the backup first shard replaces the first partial signature of the first shard for the transaction.

13. The method of claim 11, further comprising storing a backup first shard at a first backup trustee, wherein a backup partial signature of the backup first shard replaces the first partial signature of the first shard for the transaction.

14. The method of claim 11, wherein the smart card includes a computational node configured to provide, upon activation, the first partial signature of the first shard to the institution backend.

15. The method of claim 11, the first and second institution backends provide the first and second partial signatures, respectively, after determining that the transaction meets a transaction policy for each institution.

16. The method of claim 11, wherein the number of desired shards is three and a third shard of the number of desired shards of the private key is generated and stored at the first institution backend using the protocol, and the first institution backend generates the first partial signature based on the second shard and the third shard.

\* \* \* \* \*